Aug. 31, 1937.  R. B. LIENHARD  2,091,786
EGG BEATER
Filed April 9, 1937  2 Sheets—Sheet 1
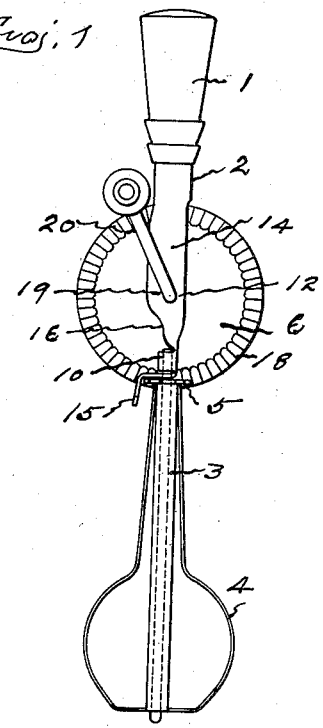
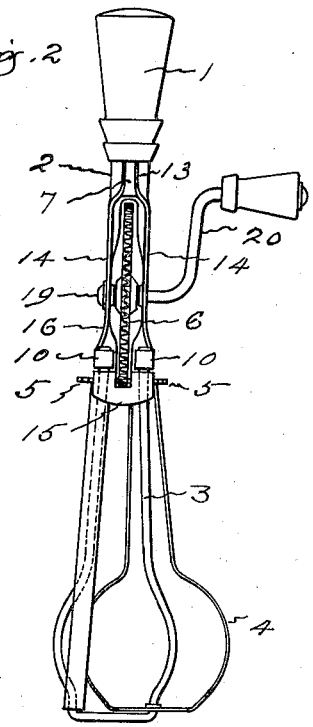
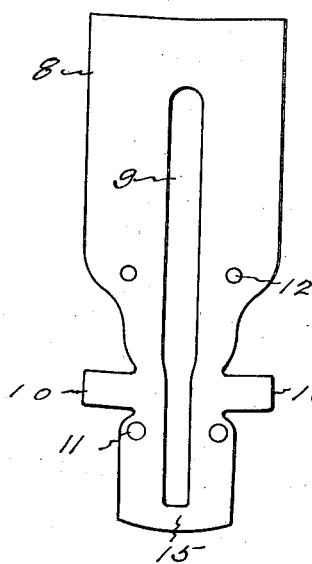
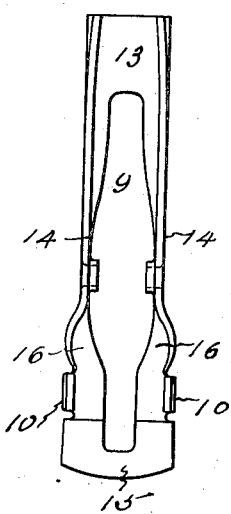
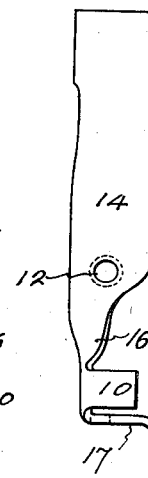
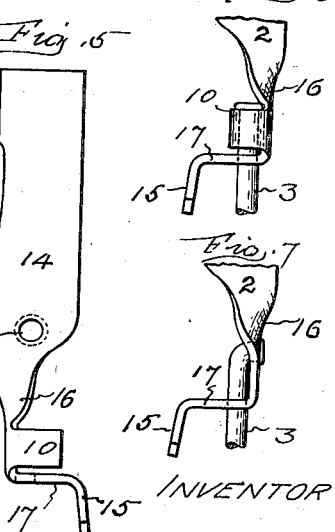
INVENTOR
Richard B. Lienhard,
by
Harry P. Williams
atty.

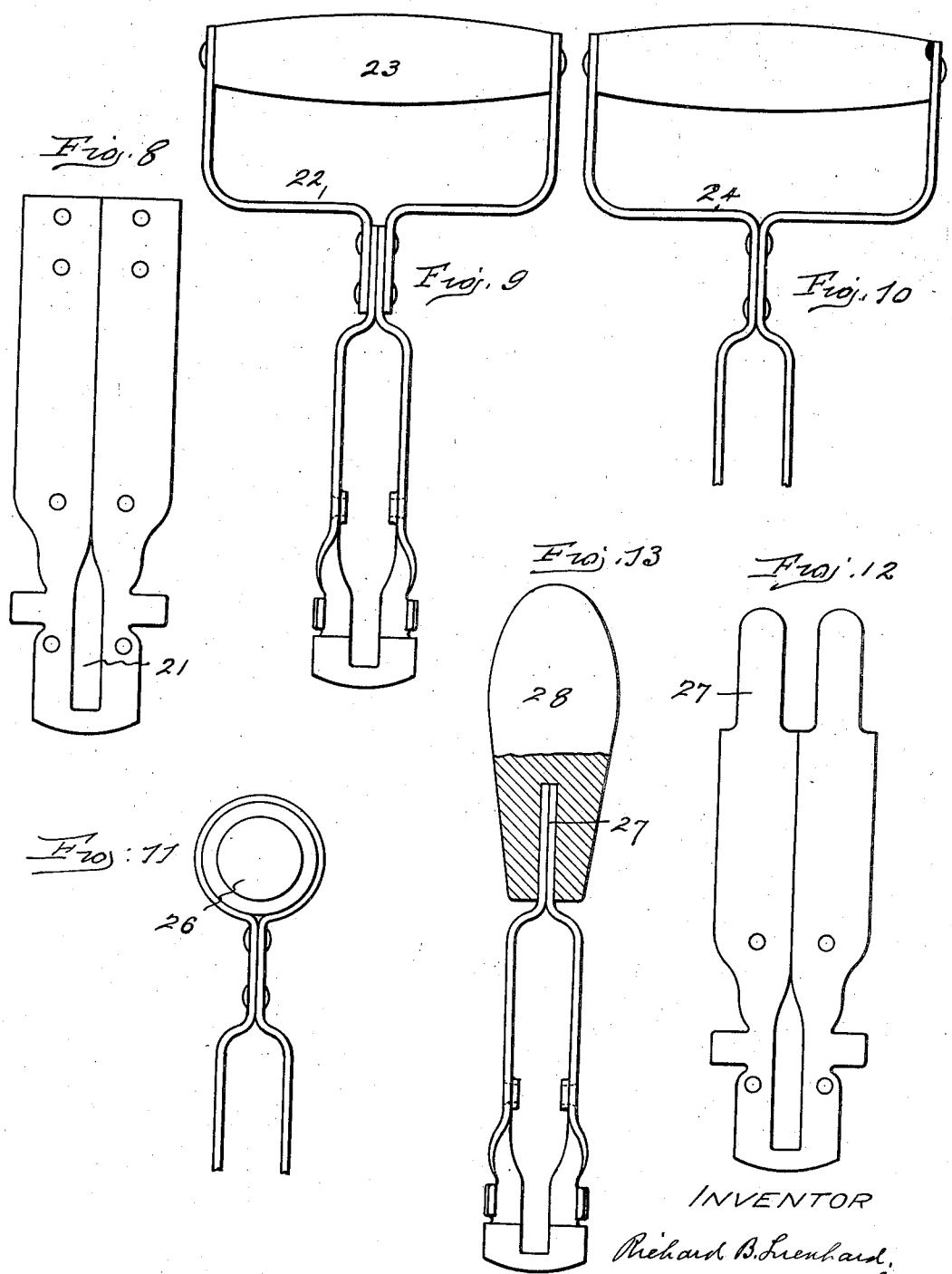

Patented Aug. 31, 1937

2,091,786

UNITED STATES PATENT OFFICE 2,091,786

EGG BEATER

Richard B. Lienhard, Newington, Conn., assignor to The Taplin Manufacturing Company, New Britain, Conn., a corporation of Connecticut Application April 9, 1937, Serial No. 135,838

1 Claim. (Cl. 259—131)

This invention relates to those culinary implements which are supplied for beating eggs and cream and mixing other heavier constituents, that are known as center drive egg beaters.

The object of the invention is to provide a center drive beater which has a frame that is cheap to construct and is rigid and durable.

In attaining this object the frame is formed of a simple metallic blank which is stamped and bent to such shape that while furnishing suitable bearings for the drive gear crank axle and firm attachment for the ends of the rod which supports and guides the dashers, it cannot spread and allow the pinions to so separate as to become disengaged from the drive gear.

In the accompanying drawings Fig. 1 shows a side view of a beater that embodies the invention. Fig. 2 shows an edge view of the same. Fig. 3 is a face view of the frame blank. Fig. 4 is a view of the frame blank partially shaped. Fig. 5 is a side view of the bent blank shown in Fig. 4. Fig. 6 shows the preferred manner of connecting the ends of the dasher rod to the frame. Fig. 7 is a view showing a modified way of connecting the rod to the frame. Fig. 8 shows a modified form of frame blank. Fig. 9 shows a frame formed from the blank shown in Fig. 8, illustrating a manner of attaching it to a D handle. Fig. 10 shows a different way of securing the frame to a handle. Fig. 11 shows a way of fastening the upper end of the frame to form a T handle. Fig. 12 shows a modified form of blank. Fig. 13 shows the manner of attaching the frame formed from the blank illustrated in Fig. 12 to a pear-shaped handle.

The beater illustrated has a handle 1, frame 2, dasher rod 3, dashers 4, pinions 5 fastened to the dashers and center gear 6 that meshes between the pinions.

The handle may be any desired type,—"pillar" (Fig. 1), D (Fig. 9), T (Fig. 11), "pear" (Fig. 13). The handle 1 first shown has a stem 7.

The frame 2 is shaped from an integral flat metallic blank 8. The blank is stamped with a central elongated slot 9 which, in the form first shown, is closed at both ends. It has lugs 10 that extend outwardly from the edges near one end and it has perforations 11 and 12. The upper section of the blank is bent longitudinally so as to form a socket 13 for receiving the handle stem 7 and provide spaced walls 14 that extend parallel on each side of the slot. The lower part of the blank is not bent longitudinally but is bent transversely outwardly and downwardly and forms a yoke 15 that extends transversely of the spaced walls 14 at the lower end of the slot 9. As a result of this the sides of the frame are twisted as at 16.

The ends of the dasher rod 3, that is of common shape, are passed through the perforations 11 which after the blank is bent are in the outwardly extending sections 17 of the frame, and in the first form shown, the lugs 10 are folded over the rod ends to secure them in place. In the modified form shown the ends of the dasher rod after passing through the perforations 11 are bent through perforations in the frame above the section 17.

The dashers 4 are of conventional outline and with the pinions 5 secured to their upper ends turn on the dasher rod 3 in the usual manner.

When the upper section of the blank is bent longitudinally to provide the parallel spaced walls 14 the perforations 12 in the blank are opposite each other. The center gear 6, that is shown as a disk with stamped corrugations 18 around its periphery which provide teeth on the opposite sides, is placed in the slot between the parallel side walls of the frame and the axle 19 of the handle crank 20 is passed through these perforations and the gear and its end headed over. In this position the teeth of the pinions mesh with opposite sides of the gear so that upon turning the crank the gear will, through the pinions, turn the dashers on the dasher rod in the usual manner.

If desired, as illustrated in Fig. 8, the blank when stamped may be slitted from its upper end to the slot 21, and after this blank has been bent and twisted to provide the parallel side walls the upper ends of the walls may be brought together and fastened to the yoke 22 to which the handle 23 is fastened, as shown in Fig. 9. Should it be preferred the upper ends of the slitted blank may be extended and bent to provide a yoke 24 for the handle 25, as illustrated in Fig. 10, or to be folded around a handle bar 26 as shown in Fig. 11. Integral tongues 27 may be formed at the upper ends of the blank (Fig. 12) and after the blank has been bent and twisted these tongues may be brought together and driven into the handle 28, as illustrated in Fig. 13.

The frame of this beater with its twisted sides being stamped, folded and bent to shape from an integral piece of sheet metal without substantial waste of stock, is cheap to produce and is stiff and rugged although of light weight. Such a frame carries all of the parts and does not distort or spread, as its side walls are united at both ends, so that the pinions and gear will get out of mesh when the beater is used to mix stiff constituents as hard sauces, bread and cake batter and the like, or after long or hard service.

The invention claimed is:

A beater which comprises a frame stamped from a single piece of relatively thin sheet metal with a longitudinal slot which is closed at its lower end, the upper section of said frame being axially bent to provide longitudinally extending spaced walls with parallel faces each side of the slot, said walls having perforations for receiving the axle of a driving gear, a double-faced driving gear located between said parallel walls and secured to said axle, the sides of said frame below said gear axle being twisted 90° with relation to said parallel walls and the lower end of said frame below said twists being bent forwardly and downwardly to provide an integral yoke which spans the periphery of said driving gear and whose faces extend transversely with respect to the planes of the faces of said parallel walls, a dasher rod secured to the lower end of said frame, dashers rotatable on said rod, pinions fastened to said dashers and engaging opposite faces of the driving gear, and a handle secured to the upper end of said frame.

RICHARD B. LIENHARD.